(12) United States Patent
Tillotson

(10) Patent No.: US 8,006,933 B2
(45) Date of Patent: Aug. 30, 2011

(54) AIRBORNE POWER STATION

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 812 days.

(21) Appl. No.: 12/049,234

(22) Filed: Mar. 14, 2008

(65) Prior Publication Data

US 2009/0230236 A1    Sep. 17, 2009

(51) Int. Cl.
B64B 1/00 (2006.01)
B64B 1/50 (2006.01)
(52) U.S. Cl. .............................. 244/127; 244/33; 244/30
(58) Field of Classification Search .................. 244/1 A, 244/1 TD, 158.3, 172.7, 172.8, 24, 30, 31, 244/32, 33, 58, 59, 60, 96, 116, 126, 127; 446/33, 225; 136/292; 320/DIG. 33
See application file for complete search history.

(56) References Cited

U.S. PATENT DOCUMENTS

| 4,361,295 A * | 11/1982 | Wenzel | 244/33 |
| 4,364,532 A * | 12/1982 | Stark | 244/30 |
| 4,581,897 A | 4/1986 | Sankrithi | 60/641.12 |
| 5,645,248 A * | 7/1997 | Campbell | 244/30 |
| 7,068,991 B2 | 6/2006 | Parise | 455/343.1 |

FOREIGN PATENT DOCUMENTS

| DE | 3331029 A1 * | 3/1985 |
| DE | 4117952 A1 * | 12/1992 |
| JP | 2002320345 A * | 10/2002 |

OTHER PUBLICATIONS

Aglietti et al., "Solar Power Generation Using High Altitude Platforms Feasibility and Viability", School of Engineering Sciences, University of Southampton.
Reuters, "Solar Power from Balloons? Scientists test idea", www.msnbc.msn.com/id/24012079/, Apr. 8, 2008.
Reuters, "Solar Balloons to Power Remote Areas?", www.msnbc.msn.com/id/24012079/, Apr. 8, 2008.
Sasaki, S. et al. (Mar. 2004). Tethered Solar Power Satellite. JAXA Research and Development Report, RR-03-005E.
Official Action, U.S. Appl. No. 12/128,561 dated Feb. 24, 2011 (13 pages).

* cited by examiner

Primary Examiner — Tien Dinh
Assistant Examiner — Richard R Green
(74) Attorney, Agent, or Firm — Caven & Aghevli LLC

(57) ABSTRACT

Disclosed is a system for generating power from sunlight collected substantially above the earth's surface, comprised of an airborne platform which supports an apparatus to collect sunlight, an apparatus to convert sunlight to electricity, and an apparatus to transmit the electricity to a selected location on the earth's surface. The invention collects solar energy above the clouds and transmits the energy to a receiving station on the ground via a cable, thereby avoiding the attenuating effects of clouds and pollution, resulting in an improved solar power generation system.

20 Claims, 9 Drawing Sheets

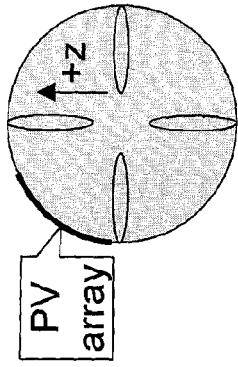
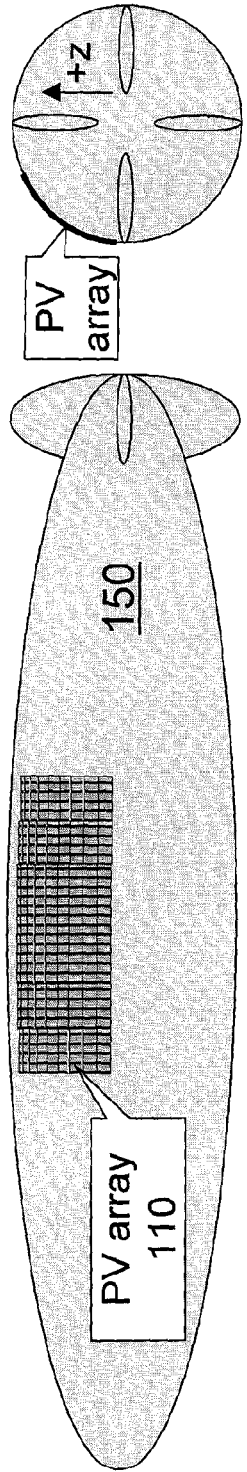
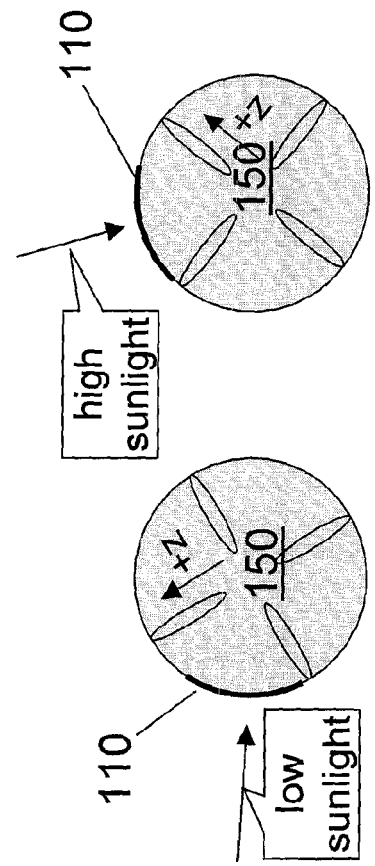

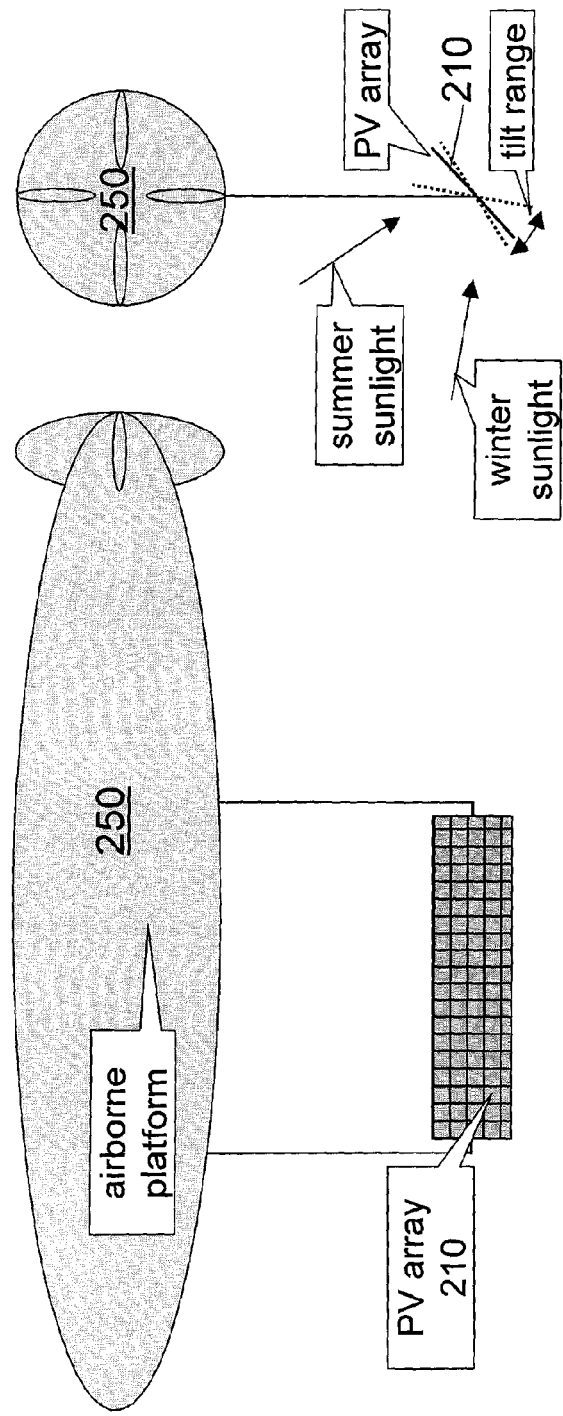
FIG. 4A
FIG. 4B
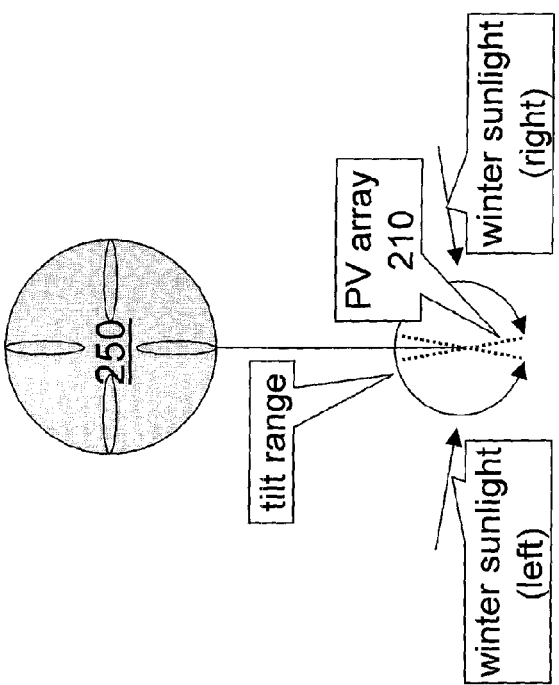
FIG. 5

AIRBORNE POWER STATION

FIELD

The present disclosure is generally related to an apparatus and method for conversion of solar energy to electricity, more particularly, is related to the deploying of solar cell arrays for maximum utilization.

BACKGROUND

There is currently a large domestic and international market for clean non-polluting generated grid and remote electrical power, such as the electrical power generated by solar energy generating systems. This demand is anticipated only to grow.

Terrestrial solar power systems typically are formed of flat panel photovoltaic (PV) cells, concentrator PV cell systems, or concentrator turbogenerators. Flat panel PV cell systems are advantageous in that they convert either direct or diffuse sunlight to electricity, though direct sunlight is preferred. The panels usually are stationary and the systems can become very large in order to generate sufficient amounts of electricity. Concentrator PV cell systems require fewer PV cells but can only convert direct sunlight to electricity, and therefore require a tracking system and clear skies. Concentrator turbogenerators use concentrated solar energy to heat a medium that is sent through a turbine to generate electricity.

One drawback in the implementation of each of these systems commercially is the expense associated with producing PV cells, tracking systems, and land costs. Moreover, solar power is not economically viable in cloudy regions such as the Northwestern United States or Northern Europe. Though solar power technically is feasible in these regions, the long intervals of low illumination a) drive a requirement for very large energy storage systems to provide power throughout the dark intervals, b) reduce the annual energy output per square meter of solar collection area, and c) do not allow use of concentrator PV cells during the frequent intervals of thin overcast. Thus, in regions of low illumination, solar power is effectively eliminated as a potential clean energy source.

Another market in which solar power is not currently economically feasible is in providing power for military forces or other mobile applications that require infrastructure. Military forces typically consume large amounts of power, and they often use this power in locations where normal infrastructure either does not exist or is threatened by enemy forces. For example, the Department of Defense (DOD) recently estimated that the actual cost for a gallon of fuel for the US Army in some parts of Iraq is $700 due to the cost of convoy security for tanker trucks or the cost of helicopter airlift of petroleum to remote locations.

Typical terrestrial power systems, such as dams, coal-fired generators, and terrestrial solar arrays, are immobile. These are unsuitable for use by military forces or emergency response agencies. Mobile terrestrial power systems typically rely on fossil fuels, e.g. diesel generators. Though these often are used by mobile forces, these power systems increase mobile forces' dependence on a steady supply of fuel, which comes at a great expense.

One suggested prior art solution for regions of low illumination is to use very large solar arrays and large energy storage systems. The large arrays produce excess power while the sun shines. This power charges the storage system. When sunlight is not available, the energy storage system is discharged to meet the need for power. Unfortunately, this solution is economically prohibitive as the internal rate of return on the large capital investment is too low for investors. The use of large energy storage adds to the cost of an already expensive system. As a result, this solution is not currently in use.

Another suggested prior art solution is to use solar power satellites (SPSs), also called space-based solar power (SBSP). This approach, proposed by Glaser in 1968 and studied extensively by researchers in the 1970's, uses extremely large satellites in geosynchronous earth orbit (GEO) to collect sunlight and transmit microwave energy to earth. Unlike sunlight, microwaves penetrate clouds, so power from SPSs is available despite cloud cover. But the initial engineering and transport costs are prohibitive. SPSs require transport of many thousands of tons of equipment to GEO for each satellite. Further, there are human safety concerns about irradiation by large side lobes of the microwave beam and environmental concerns about microwave heating of the ionosphere. Some recent studies suggest that SPSs could work in low earth orbit (LEO) where the side lobes would be smaller and less of the ionosphere would be penetrated by the beam. However, because LEO satellites spend more time in shadow and less time above a given receiver location, the duty cycle is much lower than in GEO, thereby reducing the rate of return on capital investments.

For the economic reasons discussed above, most cloudy regions in the world today have no plans to use solar power to meet their energy needs. However, most other energy options fail to meet increasing consumer (or regulatory) demand for environmental stewardship. Nuclear energy remains costly and, in many nations, politically sensitive. Most viable hydroelectric sites are already in use; furthermore, the environmental cost of hydroelectric power is increasingly recognized, resulting in some dams being torn down. Wind energy is economically and politically viable in some areas, but is not sufficiently available in many regions. Fossil fuels like petroleum or coal are becoming more costly and are implicated in global warming; petroleum is also subject to political embargoes or to attacks on oil fields, pipelines, ports, refineries, roads, or tanker ships (cf., the military costs for fuel in Iraq today.)

SUMMARY

The present disclosure provides a system and method for generating solar power at an airborne platform and transmitting that power to a control station located on the ground. The control station then converts that power to a form suitable for distribution.

More particularly, the present disclosure in one embodiment provides a system for converting sunlight to electricity. The system comprises an airborne platform for deployment above the surface of the earth. A solar power generation system is supported by or held in spaced relationship to the airborne platform. One or more power cables are provided for transmitting power from the airborne platform to a ground station. In a preferred embodiment of the disclosure, the power cables may function as tethers. Alternatively, one or more separate tethers may be provided. The system may further include one or more mooring devices to which the power lines/tethers are attached.

The apparatus generally comprises an airborne platform that includes a PV cell array and an electric cable to transport power to the ground. The airborne platform supports the solar cell array above the clouds and other atmospheric attenuation. The PV cell array comprises individual steering elements that track the sun throughout the day. These steering elements may be at least partially independent of the steering of the airborne platform to minimize the effect of wind currents on the ability to maintain direct sunlight on the PV array. As a result, the solar cells have a high duty cycle, i.e., they are exposed to direct sunlight roughly 12 hours per day, and they receive brighter sunlight than PV cells at ground level under haze, pollution, and other diffusing elements.

Unlike the prior art solutions, the system of the present disclosure locates a solar power generation system above the clouds and other attenuating elements. Therefore, the invention uses a smaller (and less expensive) set of solar arrays and much less energy storage. Because it avoids the diffusing effect of clouds and maintains direct sunlight, it allows use of concentrators. Furthermore, the solar power is transmitted to a control station by an electric cable, thus avoiding ionospheric heating and safety issues related to microwaves from SPS and SBSP technologies.

The airborne power station of the present disclosure is deployed at an altitude that corresponds to a cooler ambient temperature than ground locations. Because PV cells are more efficient at lower temperature, the solar cells of the present invention are more efficient than terrestrial solar power systems. Moreover, the solar power generation system may be suspended from the airborne platform with cables or the like, placed on the surface of the airborne platform, or located within the airborne platform.

In particular embodiments, the present disclosure provides for orienting the solar power generation system to maximize the incident angle of sunlight. This may be accomplished by steering the airborne platform or by manipulating the azimuth and elevation angles of the solar power generation system or by some combination of methods.

The present disclosure also provides for stabilizing the solar power generation system in high winds, for extending and retracting the airborne power system from a ground location, and for operating and maintaining the airborne power station.

Another aspect of the present disclosure provides a method for generating solar power from an airborne power station, comprising the steps of filling an airship with a buoyant gas, the airship including a solar power generation system, a tether, and power cables; releasing the airship from its mooring; extending the tether and power cables; orienting the solar power generation system to maximize power output; and transmitting that power to a control station.

Other systems, methods, features, and advantages of the present disclosure will be or become apparent to one with skill in the art upon examination of the following drawings and detailed description. The features, functions and advantages that have been discussed can be achieved independently in various embodiments of the present invention or may be combined in yet other embodiments further details of which can be seen with reference to the following description and drawings.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views, wherein:

FIGS. 2A and 2B are side and rear illustrations, respectively, of an airborne power station in accordance with an alternative embodiment of the present disclosure;

FIGS. 3A and 3B are rear illustrations demonstrating the operability of the airborne power station shown in FIGS. 2A and 2B;

FIGS. 4A and 4B are side and rear illustrations, respectively, of an airborne power station in accordance with an alternative embodiment of the present disclosure;

FIG. 5 is a rear illustration demonstrating the operability of the airborne power station shown in FIGS. 4A and 4B;

DETAILED DESCRIPTION

Figure 1:
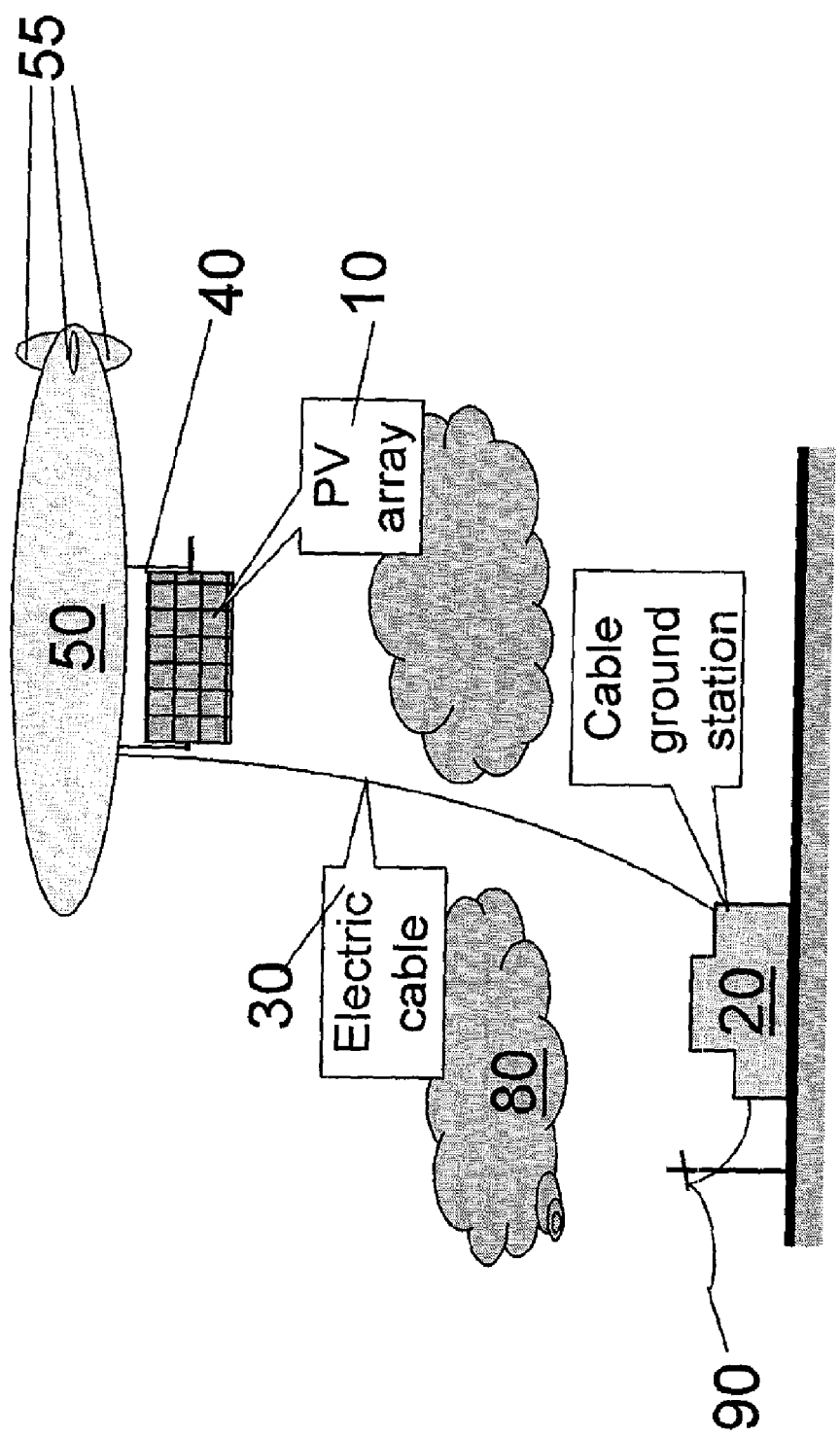
FIG. 1 is an illustration of an airborne solar power station in accordance with a first exemplary embodiment of the present disclosure.

Referring to FIG. 1, the present disclosure provides an airborne power station generally comprising an airborne platform 50 having a solar power generation system 10 and an electric cable 30 to transport power to the a control station 20 on the ground. The airborne platform supports the solar power generation system above the clouds 80 and other atmospheric attenuation. The control station receives the power generated at the airborne power station and distributes the power to, for example, local infrastructure 90.

The airborne platform may be an airship, including a blimp, a semi-rigid airship, or a rigid airship. As shown in FIG. 1, the airship 50 may have aerodynamic stabilizers 55 at the tail. The airborne platform preferably will include controls for the platform's yaw (steering), pitch, and/or roll. Airship embodiments may further include aerodynamic surfaces designed to produce lift when the wind blows.

The solar power generation system may be one or more photovoltaic (PV) cell arrays, optical rectennas, and/or electric generators driven by a solar-heated thermodynamic engine. FIG. 1 shows a PV cell array 10, which may be a flat panel cell PV array or a concentrator cell array, which is positioned below the airship by structural elements 40. Preferably structural elements 40 are rigid so as to permit pointing of the solar arrays independent of the airborne platform. In alternative embodiments, particularly for use at high latitudes, the solar power generation system hangs below the airship at a distance, e.g., by cables, where it is rarely or never shaded by the airship. In yet other alternative embodiments, the solar power generation system includes elements that can be steered, e.g. to point more directly toward the sun, in order to maximize the amount of direct sunlight, and consequently, the output of electrical energy. The solar power generation system also includes power conversion equipment that converts power from the form produced by the power generation system to a form better suited for transmission along the power cable. For example, it may convert the low-voltage DC output of a photovoltaic array to high-voltage three-phase power.

The power cables 30 transport energy from the solar power generation system to the ground. Typically the power cables comprise two electric cables (DC power down to Earth, plus a return path) or three electric cables (three-phase AC). In alternative embodiments, the one or more power cables may include an optical fiber or fiber bundle carrying optical power or a coaxial microwave cable carrying microwave power.

The power cable 30 may further function as a tether connected to the control station for restraining the airborne platform. In other embodiments, a tether may be included separate from the power cable(s), wherein the tether may be anchored by any nearby ground support. The tether must be strong enough to restrain the airborne platform in windy and stormy conditions. The tether may also support some or all weight of the power cable(s).

The tether and/or power cables may be attached to a device for retracting and extending the tether, such as a winch or mooring device. The device for extending the tether will preferably be included at the control station. This will facilitate the launch and maintenance of the airborne platform.

The control station 20 also provides a monitor and control system to permit a human operator to monitor and control the system, for example, to adjust the airship's steering fins or to open a circuit breaker in the power generation system.

The control station and airborne platform may also include a communication system to transfer data between the control station and the airborne platform. The communication system transfers data between the airship and the control station. The data may include, for example, diagnostics to measure the health of the PV array. The data may be used to optimize the performance of the airborne power station or to perform self-diagnosis.

FIGS. 2A and 2B show an alternative embodiment in which a PV cell array 110 is mounted on the surface of an airship 150. The airship and its tether attachment mechanism are configured so the airship can maintain a selected roll angle and thereby keep the PV cell array oriented toward the sun as the sun rises and sets (see FIGS. 3A and 3B). This embodiment is well suited for use of PV cell arrays composed of linear concentrator elements such as a trough concentrator or a stretched lens array. The airship 150 may also be able to maintain selected yaw or pitch angles to maximize the amount of direct sunlight, subject to structural limitations.

Another alternative embodiment, Referring to FIGS. 4A and 4B, provides the solar power generation system as a PV cell array 210 that tilts to increase the incident angle of sunlight on the array as the sun moves across the sky. According to FIG. 5, the array's range of tilt angles may be large enough that the array can flip to directly face the sun on either the right or left side of the airship. This configuration may be particularly useful if the direction that the airship 250 faces depends in part upon the direction of the wind.

Figure 6B:
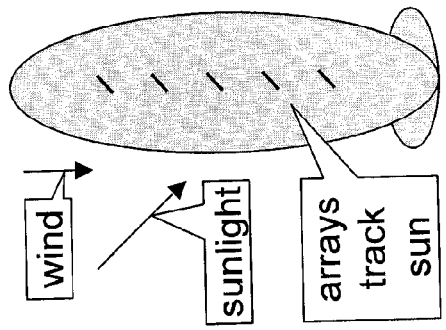
FIGS. 6A, 6B, and 6C are side, top, and top illustrations, respectively, of an airborne power station in accordance with an alternative embodiment of the present disclosure.
Figure 6A:
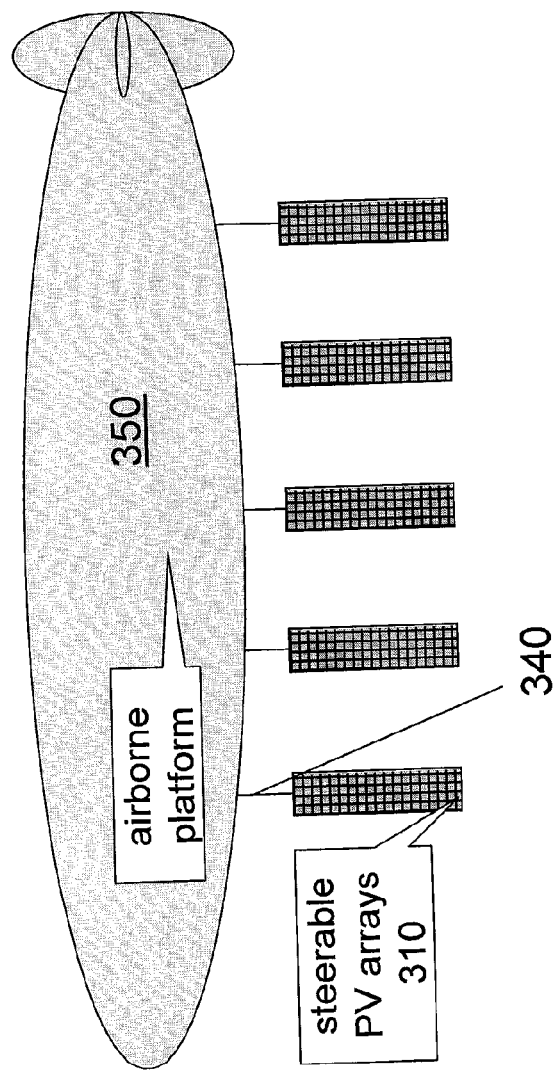
Figure 6C:
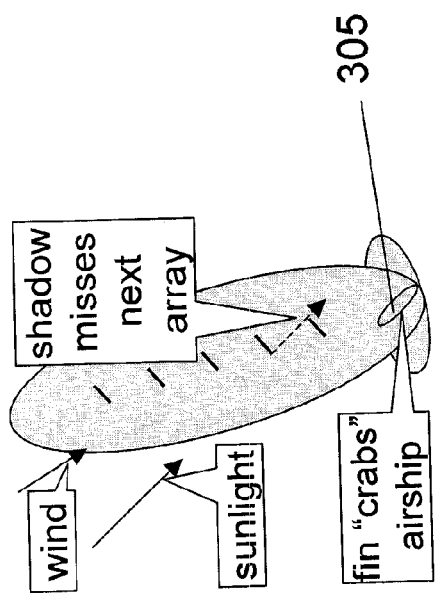

FIGS. 6A, 6B, and 6C show another alternative embodiment in which a number of thin, vertical PV cell arrays 310 hangs below an airship 350, suspended by structural elements 340. Each array can swivel in azimuth to track the sun. The arrays may face forward, aft, or to either side, even when the airship is compelled by wind to face almost directly into the sun or away from it (see FIG. 6B). When the direction toward the sun is directly upwind or downwind, the airship's steering system is configured to "crab" slightly so that the arrays do not substantially shade each other, as shown in FIG. 6C. Crabbing may be accomplished, for example, by manipulating the aerodynamic stabilizers 355 at the tail.

However, this diagonal orientation increases drag, and in turn increases the tension on the tether. Crabbing may therefore be restricted to lower wind speeds.

Figure 7B:
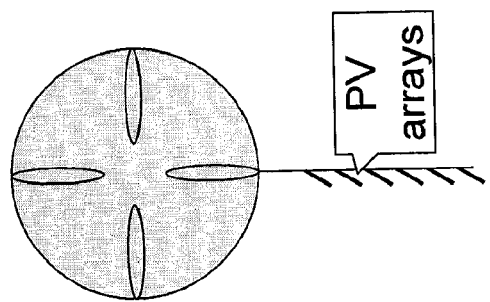
FIGS. 7A and 7B are side and rear illustrations, respectively, of an airborne power station in accordance with an alternative embodiment of the present disclosure.
Figure 7A:
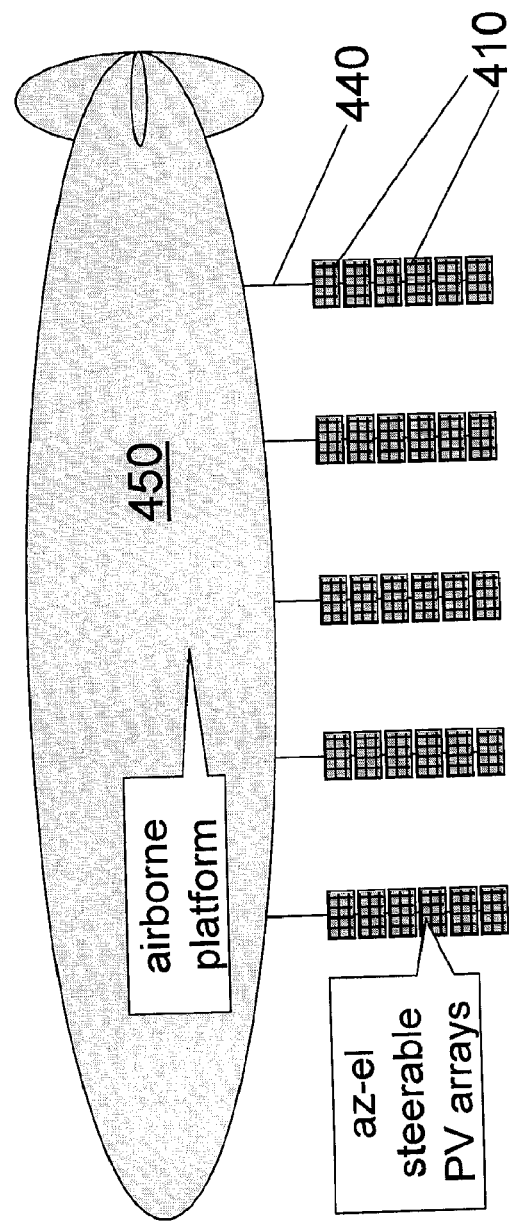

Another alternative embodiment, shown in FIGS. 7A and 7B, uses PV cell arrays 410 that swivel in azimuth and in elevation to further increase the average incident angle of sunlight on the array. In the figures, the arrays are held beneath the airship 450 by structural elements 440.

Figure 8A:
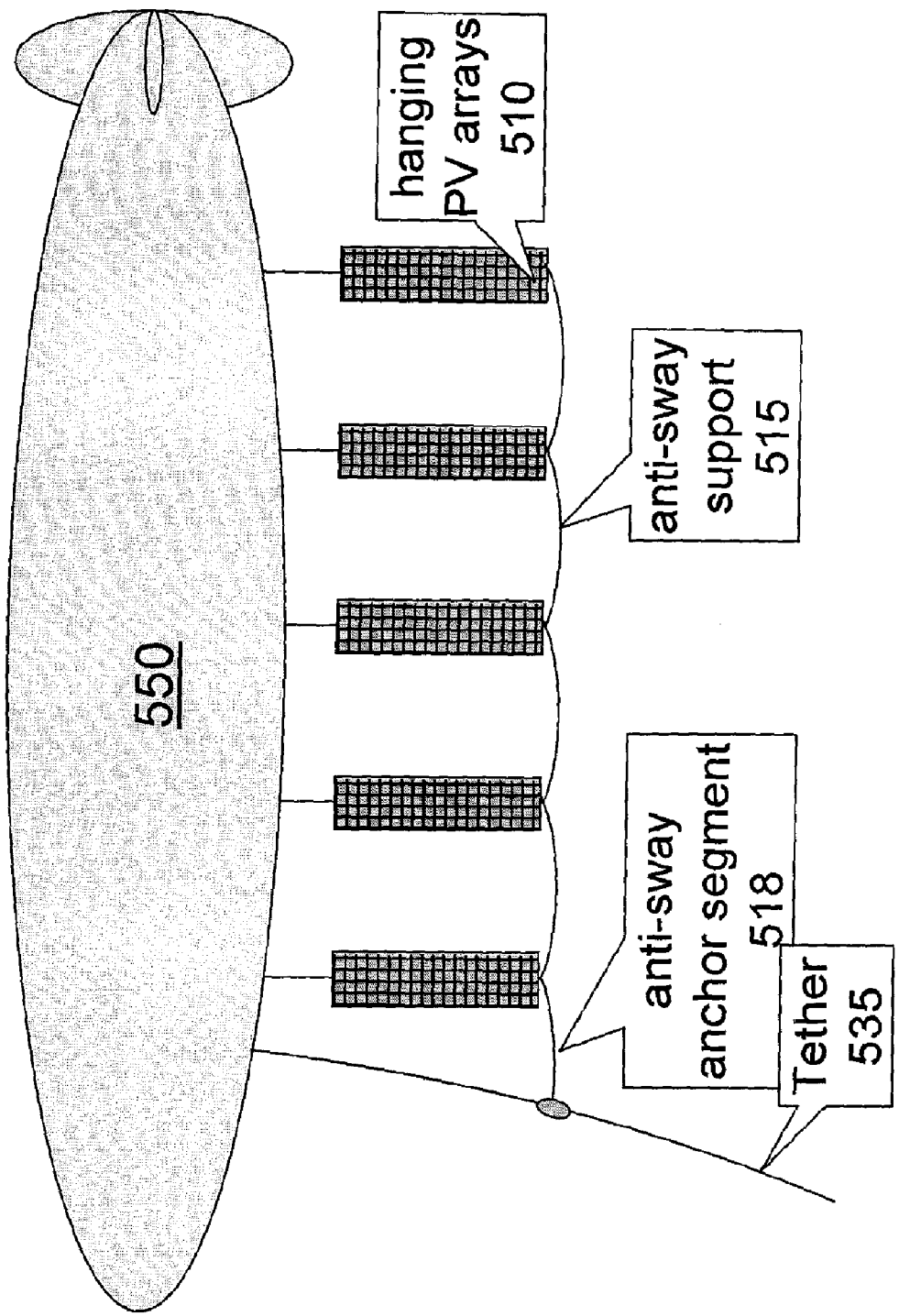
FIGS. 8A and 8B are side illustrations of an airborne power station in accordance with an alternative embodiment of the present disclosure.
Figure 8B:
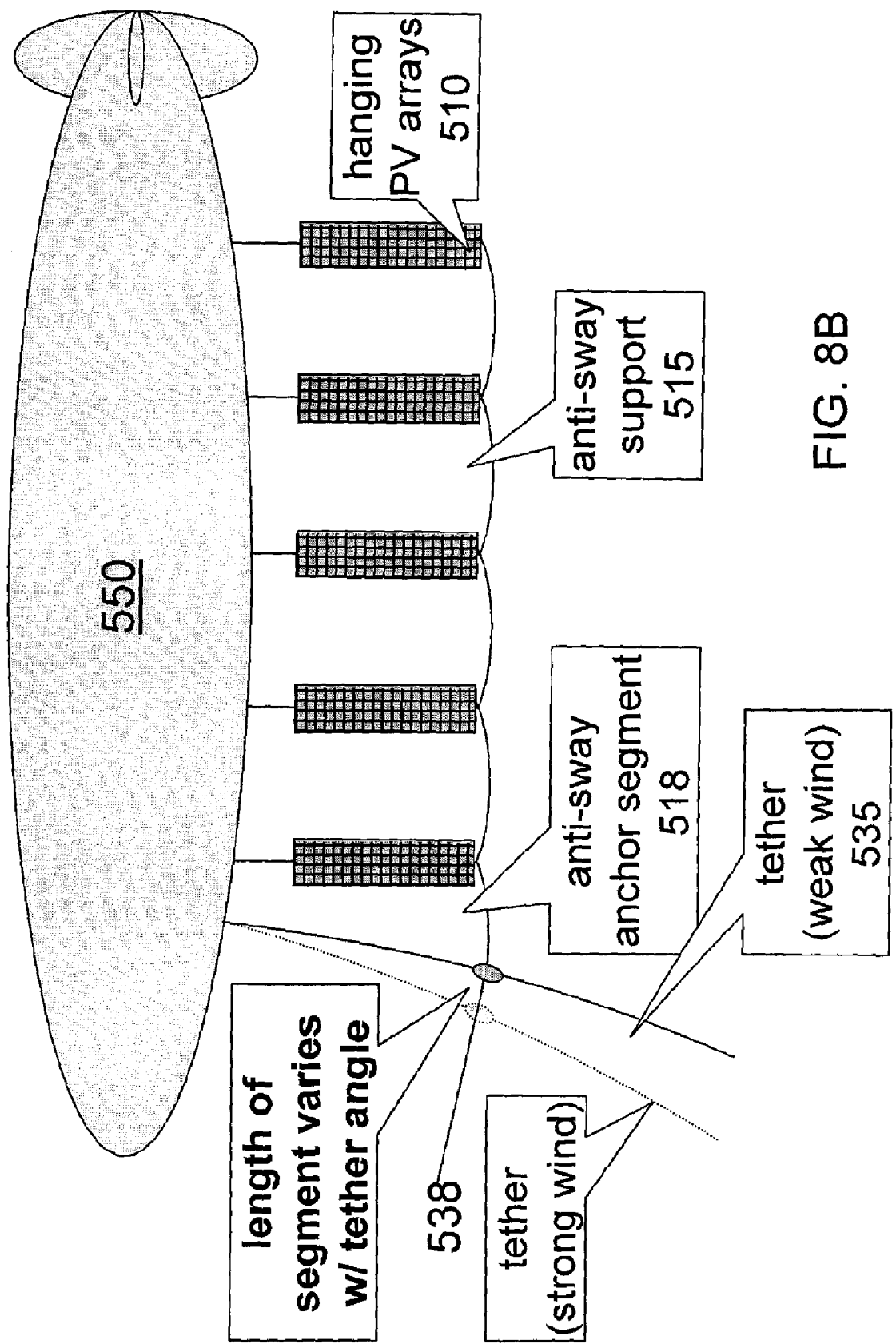

In another alternative embodiment, an anti-sway support structure 515 functions as a stabilizing element to restrain the hanging PV cell arrays to limit their relative movement in the wind. See FIGS. 8A and 8B. The anti-sway support structure may be attached to the tether 535 which provides horizontal tension to resist wind-induced drag forces on the PV cell arrays. A reel mechanism 538 may be provided to automatically vary the length of the anchor segment 518 which attaches the anti-sway structure to the tether. This will maintain position of the PV cell arrays despite changes in the position of the tether, e.g. due to variations in wind speed (See FIG. 8B).

Figure 9:
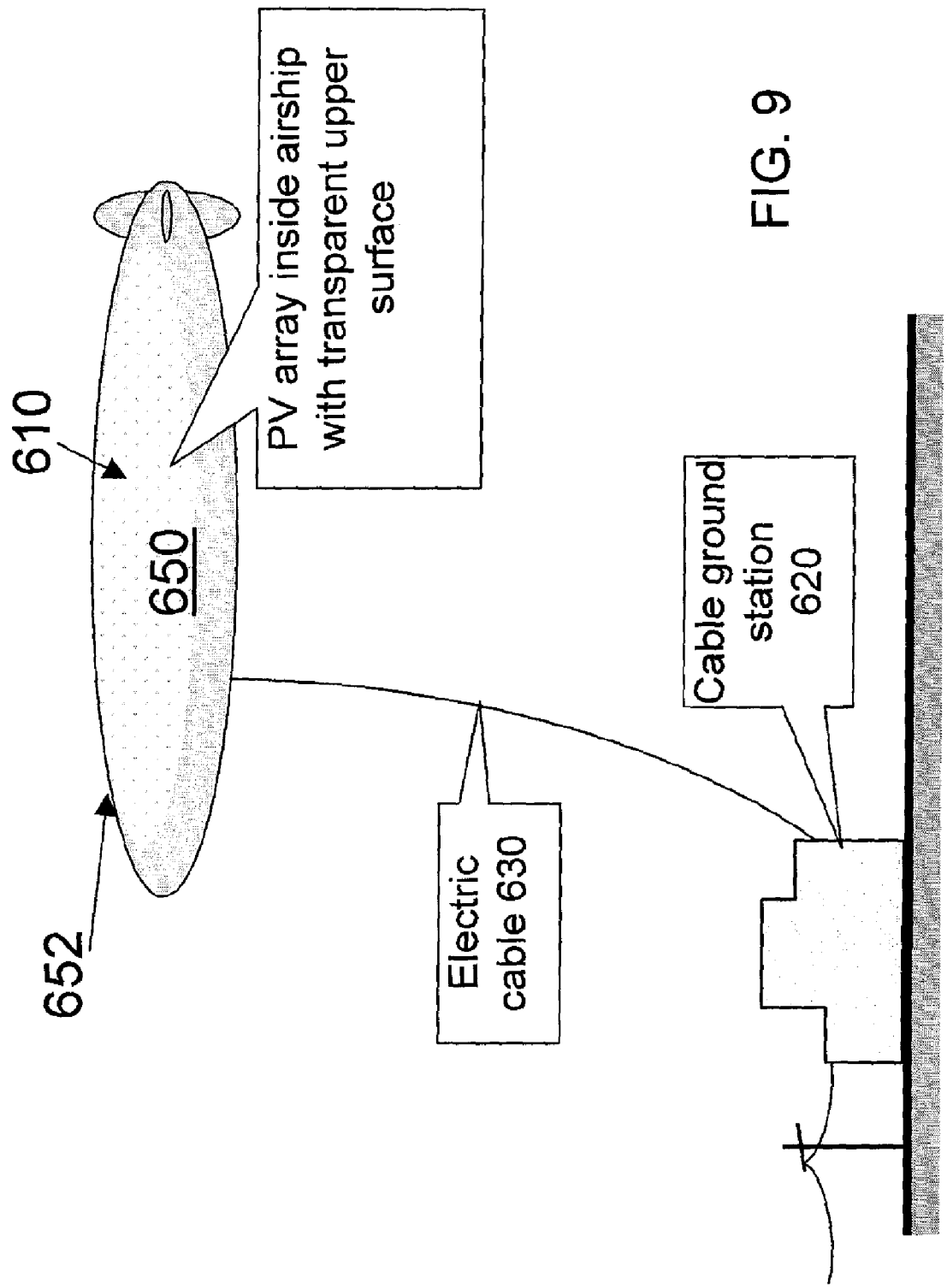
FIG. 9 is an illustration of an airborne power station in accordance with an alternative embodiment of the present disclosure.

FIG. 9 illustrates another alternative embodiment in which the airborne platform is an airship 650 with a transparent upper surface 652. This allows the PV cell array 610 to be located inside the airship where it is protected from weather and cooled by the buoyant gas. This embodiment may further incorporate the ability to rotate to a selected roll angle as in FIGS. 2A and 2B.

Figure 10:
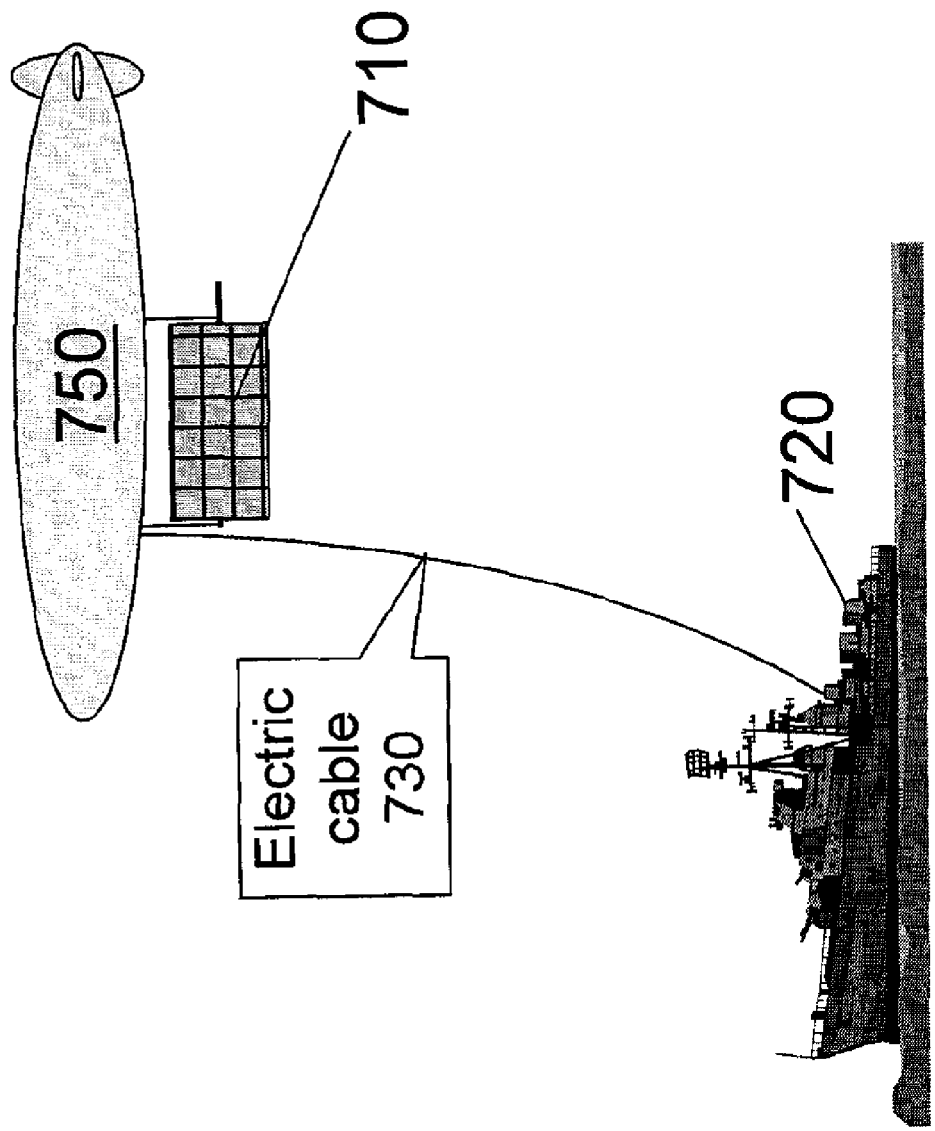
FIG. 10 is an illustration of an airborne power station in accordance with an alternative embodiment of the present disclosure.

In yet other alternative embodiments, the distal end of the cable is attached to a mobile platform on the Earth's surface. FIG. 10 demonstrates this concept with a ship 720 attached to the airborne platform 750 by electric cable 730. A mobile embodiment is particularly useful for military operations or for emergency response. It also permits relocation of the system to avoid localized high-altitude clouds, for example cumulonimbus (thunderstorm) clouds, and localized high winds.

The airborne platform may further include apparatus to repair the solar power generation system or the airship while airborne. This may be in the form of a robotic arm or other apparatus that is controlled from the control station when needed.

The system configuration may be chosen based upon the location of use and the existing infrastructure. Likewise, the decision of what parameter values to assign for each system element—such as length of the power cables, DC or AC transmission, particular PV cell technology, and peak capacity of the solar power generation system—depends on the particular application.

Another aspect of the present disclosure provides a method for providing electric power having a low environmental impact, comprising the steps of: providing an airship including a solar power generation system, a tether, and power cables; releasing the airship from its mooring; extending the tether and power cables; orienting the solar power generation system to maximize power output; and transmitting that power to a control station. The control station then converts the power output from the airborne power station for use in local infrastructure or by some other consumer.

This method may be adapted to any of the embodiments described above. For instance, the tether and power cables may be extended and retracted using winches to accomplish the launch and successive maintenance of the airborne power station. Once reaching an operating altitude, the solar power generation system, e.g., a PV cell array, may be oriented by steering the airship itself or by manipulating steering elements which control the azimuth and or elevation angle of the solar power generation system. This orientation may be done by an operator, who may be located at a control station, or may be accomplished automatically.

The system of the present disclosure provides a power source that is not fixed to one location. Once aloft, an airship can be towed (or self-propelled) to nearly any desired location. At its destination, the tether can be anchored, the power cables can be attached to the input terminals of a command post or hospital, and power begins to flow to the user without burning fuel. The expensive parts of the system are airborne, above the reach of hostile car bombs, RPGs, and small arms fire.

Where towing the airborne system is infeasible, the airship can be shipped deflated to its destination, and then inflated and deployed. U.S. military forces perform a similar procedure with the JLENS blimp-mounted radar, which carries a two-ton radar payload up to 15,000 feet above ground level.

It should be emphasized that the above-described embodiments of the present disclosure, particularly, any "preferred" embodiments, are merely possible examples of implementations, merely set forth for a clear understanding of the principles of the airborne power station. Many variations and modifications may be made to the above-described embodiments without departing substantially from the spirit and principles of the disclosure. For instance, the airborne platform may be provided with a transponder or beacon to facilitate air traffic control to avoid potential problems. To that effect, the tether or power cables may further include lights. All such modifications and variations are intended to be included herein within the scope of this disclosure and protected by the following claims.

What is claimed is:

1. A system for converting sunlight to electricity comprising:
    an airborne platform;
    a solar power generation system supported by and held in spaced relationship to the airborne platform, wherein the solar power generation system is suspended below the airborne platform by at least one vertically-positioned rigid structural element extending from the airborne platform to the solar power generation system, and wherein the solar power generation system is movable relative to the airborne platform;
    at least one ground station; and
    at least one power carrier positioned to carry power from the airborne platform to the at least one ground station.

2. The system of claim 1, wherein the at least one power carrier comprises at least one power cable.

3. The system of claim 2, wherein the at least one power cable is attached to at least one mooring device on the ground.

4. The system of claim 1, wherein the solar power generation system includes a plurality of steerable solar energy collection panels.

5. The system of claim 1, further comprising at least one tether connected between the airborne platform and at least one mooring device on the ground.

6. The system of claim 1, wherein the airborne platform further comprises an airship.

7. The system of claim 6, wherein the airship includes steering elements for orienting the airship or for stabilizing the airship in position.

8. The system of claim 1, wherein the solar power generation system includes at least one of photovoltaic cells and concentrating photovoltaic cells.

9. The system of claim 1, wherein the at least one rigid structural element is connected between the airborne platform and the solar power generation system.

10. The system of claim 1, wherein the solar power generation system is suspended below the airborne platform with at least one cable.

11. A system for converting sunlight to electricity comprising:
    an airborne platform;
    at least one steering element externally attached to the airborne platform, the at least one steering element moveable independent of the airborne platform, wherein the at least one steering element is capable of orienting the airborne platform;
    a solar power generation system supported by the airborne platform by at least one vertically positioned rigid structural element extending from the airborne platform to the solar power generation system;
    at least one ground unit; and
    at least one power carrier positioned to carry power from the airborne platform to the ground unit.

12. The system of claim 11, wherein the at least one power carrier further comprises at least one power line.

13. The system of claim 12, wherein the at least one power line is attached to at least one mooring device on the ground.

14. The system of claim 11, wherein the solar power generation system includes a plurality of steerable solar energy collection panels.

15. The system of claim 11, wherein the solar power generation system is supported by and held in spaced relationship to the airborne platform.

16. The system of claim 11, wherein the at least one steering element is capable of orienting the airborne platform without a propulsion system.

17. A method for providing electric power, comprising the steps of:
    providing an airship;
    supporting a solar power generation system with the airship, wherein the solar power generation system is suspended from the airship with at least one vertically-positioned rigid structural element extending from the airborne platform to the solar power generation system;
    releasing the airship from a mooring;
    extending at least one power cable from the airship;
    orienting the solar power generation system to the Sun; and
    transmitting a power output of the solar power generation system to a ground station with the at least one power cable.

18. The method of claim 17, further comprising the step of converting the power output from the solar power generation system for distribution to one or more users.

19. The method of claim 18, further comprising the step of orienting a plurality of solar energy collection panels towards the Sun.

20. The method of claim 18, wherein the at least one power cable further comprises a tether line.

* * * * *